Nov. 20, 1962  S. HOCHBERG  3,065,102
PROCESS FOR INHIBITING HYDROGEN POPPING
Filed March 5, 1959

FIG. 1

APPLYING A SOLUBLE ORGANIC PEROXYGEN COMPOUND IN SOLUTION IN VOLATILE LIQUID ORGANIC SOLVENT THEREFOR TO THE SURFACE OF METAL SUSCEPTIBLE TO HYDROGEN RELEASE ON HEATING.

↓

APPLYING AT LEAST ONE COAT OF A HEAT-CURABLE LIQUID ORGANIC COATING COMPOSITION IN THE PRESENCE OF THE APPLIED ORGANIC PEROXYGEN COMPOUND.

↓

HEAT-CURING THE APPLIED ORGANIC COATING AT A CURING TEMPERATURE OF AT LEAST 250°F.

FIG. 2

APPLYING CONCURRENTLY A HEAT-CURABLE LIQUID ORGANIC PRIMER COMPOSITION AND A SOLUBLE ORGANIC PEROXYGEN COMPOUND IN SOLUTION IN A VOLATILE LIQUID ORGANIC SOLVENT THEREFOR TO THE SURFACE OF METAL SUSCEPTIBLE TO HYDROGEN RELEASE ON HEATING.

↓

SUPERIMPOSING AT LEAST ONE COAT OF A HEAT-CURABLE LIQUID ORGANIC TOPCOAT COMPOSITION ON THE PRIMER COAT IN THE UNCURED STATE.

↓

HEAT-CURING THE APPLIED ORGANIC COATING COMPOSITE OF THE PRIMER AND THE TOPCOAT AT A CURING TEMPERATURE OF AT LEAST 250°F.

FIG. 3

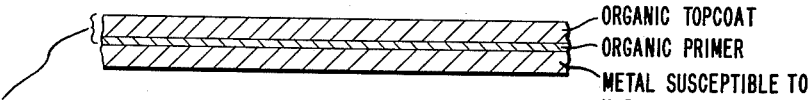

HEAT-CURED ORGANIC COATING COMPOSITE OF HEAT-CURABLE ORGANIC TOPCOAT SUPERIMPOSED ON A HEAT-CURABLE ORGANIC PRIMER APPLIED IN THE PRESENCE OF A SOLUBLE ORGANIC PEROXYGEN COMPOUND.

— ORGANIC TOPCOAT
— ORGANIC PRIMER
— METAL SUSCEPTIBLE TO HYDROGEN RELEASE ON HEATING.

INVENTOR
SEYMORE HOCHBERG

BY Charles E. Bartsch

AGENT

United States Patent Office 3,065,102
Patented Nov. 20, 1962

3,065,102
PROCESS FOR INHIBITING HYDROGEN POPPING
Seymore Hochberg, Wynnewood, Pa., assignor to E. I. du Pont de Nemours and Company, Wilmington, Del., a corporation of Delaware
Filed Mar. 5, 1959, Ser. No. 797,342
7 Claims. (Cl. 117—49)

This invention relates to a method of coating a metal substrate with a protective or decorative organic coating which is dried or cured at an elevated temperature, the metal substrate either initially containing occluded hydrogen in detrimental amount or being in a potentially reactive state to release hydrogen under the coating conditions to supply hydrogen in an amount sufficient to cause bubbles or blisters in the dried organic coating. This objectionable condition of bubbling or blistering is ordinarily referred to in the trade as "hydrogen popping." More particularly, the invention relates to a method for inhibiting hydrogen popping in organic coatings applied to metal surfaces susceptible to hydrogen popping, organic coating compositions which are inhibitive toward hydrogen popping, and to an organic coated metal article having on at least one surface of the metal a thin contiguous organic coating which is free of hydrogen popping defect.

In order to provide sheet steel with additional resistance to corrosion for utility in fabricating appliances, such as washing machines, drying machines, refrigerators, freezers, sink enclosures and the like, the steel is zinc-plated and ordinarily is further subjected to a phosphatizing treatment to improve anti-corrosion and enhance adhesion of superimposed protective and decorative organic finishes. Anti-corrosion treated sheet steel of this type used in appliance fabrication is susceptible to hydrogen popping and when an organic coating is applied to the sheet metal and heated to a baking temperature of about 250° F. or higher, the released hydrogen which does not permeate the organic coating to escape to the atmosphere is trapped in the baked or heat-cured organic coating in the form of the defect defined as hydrogen popping.

Prior to my invention, appliance fabricators have in some instances remedied hydrogen popping by pre-exposing the sheet metal which normally is susceptible to causing this popping defect to an elevated temperature at least equal to the baking temperature to be used with the subsequently applied organic coating, the heat-exposure time being approximately equal to the baking period for the organic coating, usually at least 10 minutes. Under these preheating conditions, the hydrogen escapes to the atmosphere and any residual hydrogen in the metal ordinarily is insufficient to cause hydrogen popping in the organic coating baked under substantially the same heating conditions.

In some operations the organic coating consists essentially of a separately baked primer coat plus a top-coat baked on the primer coat. When the primer coat is adequately thin and permeable to the hydrogen, no hydrogen popping defect is present in the two-bake composite coating of primer-topcoat because the detrimental concentration of hydrogen released by the metal is permitted to escape to the atmosphere during the primer bake before it is entrapped by the less permeable composite coating. Techniques for applying a substantially uniform coating thickness sometimes are inadequate to prevent a thick edge coat and like irregularities in film thickness with the result that hydrogen popping appears in these particular thicker coating areas and not in the major area which is uniformly coated at a film thickness adequately permeable. Hence, this technique is not foolproof.

Many appliance coatings are more effectively and advantageously applied as a single-baked composite of primer plus topcoat, the topcoat being applied to the superficially dried primer coat, i.e. flash dried by loss of most of the volatile portion therefrom. The composite coating is heated thereafter at a curing temperature in the range of from 250° F. to about 500° F. for a period sufficient to effect the desired degree of cure, usually ranging from several minutes at 500° F. to 150 minutes at 250° F. In some instances the appliance coatings are self-priming and the desired dry film thickness is obtained in either a single coat or a plurality of coats ordinarily applied wet on wet. Appliance coatings ordinarily range from about 1.2 to 4 mils dry thickness of which from about 0.5 to 1.5 mils usually is primer and from about 0.7 to 2.5 mils is topcoat.

While it is feasible to use the first described metal-preheating technique for inhibiting hydrogen popping in combination with application of a plurality of coats of a composite organic coating cured by a single bake, the economical advantages of the single-bake are lost if preheating of the metal equivalent to a second bake is required for inhibition of hydrogen popping.

I have now discovered an effective and economical means for inhibiting hydrogen popping in organic coatings applied by the described single-bake technique on metal substrates which ordinarily cause the hydrogen popping defect. The technique essentially involves contacting the metal surface which is susceptible to causing the hydrogen popping defect with an effective small concentration of a soluble peroxygen compound in solution in a volatile liquid solvent therefor, preferably an organic solvent, the amount of the peroxygen compound being sufficient to inhibit release from the metal surface of a detrimental concentration of hydrogen sufficient to be entrapped by a superimposed organic film-forming coating and cause the popping defect under the particular conditions for applying the coating and baking it at an elevated temperature which ordinarily is at least 250° F. Contacting the metal surface with a dilute solution of the soluble peroxygen compound is accomplished either by a separate initial step of wetting the metal surface with the solution of the peroxygen compound or more advantageously by including the soluble peroxygen compound, preferably organic peroxygen compound, in solution form in the initially applied coat of liquid organic film-forming coating composition, this initial film-forming coating usually being a primer composition. The organic coating applied on the metal substrate in the presence of the organic peroxygen compound is built to the desired dry film thickness in either a single coat or a plurality of coats, and the complete coating is heated at a baking temperature of at least 250° F. and below the decomposition temperature of the organic coating, usually no greater than 500° F. The complete coating usually consists of a plurality of coats forming a composite coating including a primer layer contiguous with the metal surface and a topcoat layer, the primer layer and the topcoat layer usually differing substantially in composition.

An understanding of the invention is facilitated by reference to the self-explanatory drawings, wherein:
FIGURE 1 is a flowsheet of one form of the process,
FIGURE 2 is a flowsheet of another form of the process, and
FIGURE 3 is a cross-section of a base material coated by the instant process.

When the solution of the soluble peroxygen compound is separately used to initially wet the metal surface, practical concentrations of effective peroxygen compounds, preferably organic peroxygen compounds, can range up to 10% by weight, ordinarily a concentration up to 5% being adequate. In some instances a concentration as low as 0.1% is effective. No significant advantage is recognized in use of a concentration in excess of 10% of the peroxygen compound. After the volatile liquid solvent for the peroxygen compound has substantially volatilized from the wetted metal surface, the organic coating is built on the peroxygen-treated metal surface and then single-baked at the baking-temperature and time conditions characteristic of the particular organic coating.

The solvent for the soluble peroxygen compound can be any non-reactive volatile liquid solvent which will dissolve an effective concentration of the peroxygen compound, is non-corrosive toward the metal and which has a boiling end point desirably no greater than the maximum temperature ordinarily used in heat-curing or baking the applied organic finish, i.e. usually no greater than 500° F. Ordinarily, useful solvents have an initial boiling point of at least 175° F. Aromatic hydrocarbon solvents, such as toluol, xylol, high solvency petroleum naphthas, and other non-polar and polar organic solvents ordinarily used on volatile diluents or solvents in paint and enamel coating formulas and which adequately dissolve the peroxygen compound can be used as the volatile solvent therefor. In some instances water or aqueous solutions of organic solvents can be used as the solvent for the peroxygen compound, but organic solvents are preferred.

In wetting the metal surface with the solution of the soluble peroxygen compound, the metal article can be dipped into a bath consisting of a solution of the peroxygen compound, withdrawn from the bath and allowed to drain free of the treating solution, or the treating solution can be applied to the metal surface by brushing, spraying, swabbing or other ordinary means of wetting a surface with a liquid. If desired, the solution of the peroxygen compound can be projected at the surface by a chlorofluoromethane propellant.

Wetting of the metal surface ordinarily is at room temperature, neither the metal nor the solution ordinarily being at a temperature significantly above 100° F. While higher temperatures of application are operative, the application temperature should be below the decomposition temperature of the peroxygen compound and below the initial boiling point of the volatile solvent for the peroxygen compound.

While it is convenient in some instances to separately wet the metal surface as the initial step and then apply the organic finish, the preferred procedure is to concurrently wet the metal surface with the solution of the peroxygen compound of organic composition in a volatile organic solvent therefor and apply the initial coat of the organic coating. This concurrent application of the solution of organic peroxygen compound and initial coat of organic coating composition can be by simultaneous application of the two separate materials, such as by spraying. The concurrent application is preferably accomplished by appropriately combining the solution of the organic peroxygen compound with the first-to-be-applied liquid organic coating composition. The organic peroxygen compound can be either predissolved in the volatile organic solvent therefor and compatibly mixed with the liquid organic coating composition in proportions which provide an effective concentration of the organic peroxygen compound or directly dissolved in an effective proportion in the volatile organic liquid portion of the organic coating composition provided the liquid portion includes an adequate solvent for the organic peroxygen compound.

An effective concentration of the organic peroxygen compound in the liquid organic coating composition usually is from 0.2% to about 5% based on the weight of the liquid coating composition, preferably from 0.5% to 3%. Use of a concentration of the peroxygen compound in excess of 3% may cause package and storage stability problems and in some instances necessitate premixing the solution of the peroxygen compound and the liquid coating composition shortly before use. For example a concentration of dibenzoyl peroxide in this ordinarily preferred range usually causes gelation of the liquid coating composition during storage. Premixing is not necessarily a handicap because liquid organic coating compositions are ordinarily supplied at higher than application concentration in anticipation that they be thinned or adjusted to conform with the customer's desired application conditions. In such thinning operations, the organic peroxygen compound or solution thereof can be conveniently included with the thinner for the liquid organic coating composition. When the liquid coating composition is an aqueous dispersion, it is desirable to select peroxygen compounds which are water-soluble or soluble in the continuous aqueous phase of the coating composition which may include a water-miscible organic solvent.

The initial liquid coating composition or primer containing the dissolved organic peroxygen compound is applied to the metal surface at ordinary priming thickness, i.e. at a wet thickness which provides from about 0.5 to 1.5 mils of dry coating thickness. This wet primer coating is applied at ordinary room temperature and after the coating is allowed to superficially dry by volatile loss of a major proportion of the content of volatile liquid diluent thereof, a topcoat organic coating composition is applied by one or a plurality of successive coats over the primer for a total dry film thickness up to about 4 mils for the composite of the primer layer and the topcoat layer. The coating composition superimposed on the primer coat can be the same as the primer composition or different. Ordinarily it is different in order that the primer composition be provided with optimum characteristics pertinent to relationship between the organic coating and the metal and the topcoat composition be provided with optimum characteristics pertinent to resistance of the exposed surface finish toward the environment in which it is exposed. If desired, the organic peroxygen compound can be present in the liquid topcoat composition, but the presence of the organic peroxygen compound in the topcoat ordinarily serves no significantly useful function in reference to inhibiting hydrogen popping.

To provide effective contact between the peroxygen compound and the hydrogen-active metal surface, the organic peroxygen compound must be present in effective concentration in the liquid primer composition or the metal surface must be initially wet with a solution of an effective concentration of the organic peroxygen compound prior to application of the liquid coating compositions which either are free of organic peroxygen compound or contain an ineffective concentration. To include the organic peroxygen compound in the superimposed liquid topcoat composition in the absence of prior exposure of the metal surface to contact with the organic peroxygen compound, does not provide adequate exposure of the metal surface to the peroxygen agent for inhibition of hydrogen popping.

A wide variety of soluble organic peroxygen compounds, including both organic hydroperoxides and organic peroxides, are useful in practicing the invention. However, in order that an effective concentration of peroxygen moiety —O—O— is provided at a practical concentration of no more than 10% of the organic peroxygen compound, it is desirable that the number of carbon atoms in the organic radical or radicals of the organic peroxygen compound does not exceed 22 carbon atoms per one —O—O— peroxygen moiety. Preferably the peroxygen equivalent weight of the compound does not exceed 225 grams. The peroxygen equivalent weight is defined as that weight in grams of the peroxygen compound which provides one equivalent, i.e. 32 grams, of the peroxygen moiety —O—O—. For example, the peroxygen equivalent of cumene hydroperoxide is about 152 grams and that of hydrogen peroxide is about 34 grams.

While highly volatile, low molecular weight organic peroxygen compounds and even hydrogen peroxide, in some instances are operative, techniques required to maintain adequate contact exposure between the metal surface and the highly volatile peroxygen compounds are not readily adaptable to conveyorized production finishing methods. Therefore, use of these highly volatile peroxygen compounds is not significantly practical. For practical operations, useful organic peroxygen compounds are characterized by a volatility no greater than that of tertiary butyl peroxide in order that the contact exposure is of adequate duration. For reasons of stability and preferred lower volatility, each organic radical of the organic peroxides or organic hydroperoxides preferably contains at least 4 carbon atoms.

Hydrocarbon hydroperoxides having the hydroperoxy radical thereof linked directly to a saturated tertiary carbon atom, such as represented by the general formula:

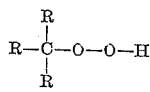

and dihydrocarbon peroxides having each oxygen atom of the peroxy moiety —O—O— linked directly to a saturated tertiary carbon atom, such as represented by the general formula

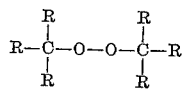

are preferred classes of the organic peroxygen compound. In these general formulas, each substituent R— represents a like or different alkyl, aryl, aralkyl or alicyclic radical. Cumene hydroperoxide is a particularly preferred species of the above identified class of hydrocarbon hydroperoxide and di-tertiarybutyl peroxide is a particularly preferred species of the above identified class of dihydrocarbon peroxides.

Representative additional species of useful peroxygen compounds for inhibiting hydrogen popping include the following:

Tertiarybutyl hydroperoxide
Dimethyl-isopropyl-hydroperoxymethane
Dimethyl-sec. butyl-hydroperoxymethane
2,2,4-trimethyl-4-hydroperoxypentane
2,2,5-trimethyl-5-hydroperoxyhexane
3-methyl-3-hydroperoxybutane
Alpha, alpha-dimethylbenzyl hydroperoxide
Alpha, alpha-dimethyl-p-isopropylbenzyl hydroperoxide
Alpha, alpha-ethylmethylbenzyl hydroperoxide
1,1-dimethyl-1-cyclohexyl-methyl hydroperoxide
1,1-dimethyl-1-(p-isopropyl-cyclohexyl) methyl hydroperoxide
1-cyclohexyl-1-hydroperoxy cyclohexane
2-naphthyl-2-hydroperoxypropane
2-cyclopentyl-2-hydroperoxypropane
Cyclopentyl hydroperoxide
Cyclohexyl hydroperoxide
Cyclohexene hydroperoxide
1-chloro-2-phenyl-2-hydroperoxypropane
Monochloro-tertiarybutyl hydroperoxide
Monobromo-tertiarybutyl hydroperoxide
2-fluoro-3-methyl-3-hydroperoxybutane
Pinane hydroperoxide
Tertiarydodecyl hydroperoxide
Iso-octenyl hydroperoxide
Tetralin hydroperoxide
Diisopropyl benzene monohydroperoxide
p-Menthane hydroperoxide
Saturated monocyclic terpene hydroperoxides ($C_{10}H_{19}OOH$)
Saturated bicyclic terpene hydroperoxides ($C_{10}H_{17}OOH$)
Dipropyl peroxide
Isopropyl tertiarybutyl peroxide
Ditertiaryamyl peroxide
Di-amyl peroxide
Di-cyclohexyl peroxide
Cumyl tertiarybutyl peroxide
Allyl tertiarybutyl peroxide
Chloro-di-tertiarybutyl peroxide
Di-benzoyl peroxide
Tertiarybutyl perbenzoate
Tertiarybutyl perlaurate
Tertiarybutyl perstearate The composition of the organic finish applied to the metal surface is not significantly critical and is dictated by the contemplated utility of the coated metal article. The organic coating or composite finish of organic primer layer and organic topcoat layer in appliance utility ordinarily are formulated with a heat-convertible or baking-type organic film-forming material. These coating compositions referred to as heat-curable coatings, harden or heat-convert rather than merely dry by loss of the volatile liquid portion therefrom. The heat-curable organic coating composition ordinarily comprises a non-volatile film-forming resinous component which is heat reactive or thermosetting, a non-volatile film-forming thermoplastic resinous component which functions as a plasticizer, pigment, and a volatile liquid organic portion comprising at least one solvent for the heat-reactive resinous film-forming component and the resinous plasticizer. The proportions of the ingredients are varied widely to conform with the characteristics desired in the product. In some instances the resinous plasticizer is the major organic film-forming component and the heat-reactive resinous component is present in minor proportion sufficient to provide the desired hardness and degree of thermoset in the cured finish.

Representative heat-reactive resinous film-forming components include urea/formaldehyde resinous condensates, melamine/formaldehyde resinous condensates, urea/melamine/formaldehyde resinous condensates, phenol/formaldehyde condensates and acetone/formaldehyde condensates all of which are in the solvent soluble stage.

Representative of the resinous plasticizer components are the long chain length monocarboxylic acid modified alkyd resins, particularly the coconut oil fatty acids or castor oil fatty acids modified glyceryl phthalate alkyd resins, soluble vinyl copolymers derived from a monomer mixture of two or greater plurality of vinyl monomer components including styrene and/or acrylonitrile, an acrylic acid ester or a methacrylic acid ester and a small proportion, up to about 15%, of acrylic acid or methacrylic acid (e.g. a terpolymer of a mixture of 70 parts styrene, 20 parts ethyl acrylate and 10 parts methacrylic acid and a quadripolymer of 40 parts styrene, 15 parts acrylonitrile, 40 parts butyl acrylate and 5 parts methacrylic acid), soluble vinyl copolymers at least ternary in composition derived from vinyl monomer mixtures of the aforementioned polymerizable monomers further including a polymerizable monomer having a 1,2 epoxide group, e.g. glycidyl methacrylate and allyl glycidyl ether, epoxy-polyether resins typical of those obtained by condensing epichlorohydrin with a polyhydric phenol such as diphenylolpropane or diphenylol methane; and esters of these epoxy-polyether resins obtained by reacting the hydroxyl equivalent thereof in part with a long chain fatty monocarboxylic acid.

For appliance primer use, a particularly desirable plasticized heat-curable film-forming vehicle consists essentially of a mixture of urea-formaldehyde-alkanol condensates and/or melamine-formaldehyde-alkanol condensates plus an esterified epoxy-polyether resin condensate of epichlorophydrin and either diphenylol propane or diphenololmethane, characterized by an epoxy equivalent weight in the range of 500 to 1500 grams and an esterification equivalent weight in the range of 130 of 190 grams, having the esterification equivalent thereof 35% to 50% satisfied with a long chain $C_{10}$ to $C_{22}$ fatty monocarboxylic acid, preferably an unsaturated fatty acid among which dehydrated castor oil fatty acids are particularly preferred. Inasmuch as the esterified epoxypolyether resin functions as a crosslinkable resin in combination with the heat-reactive amine nitrogen resins, e.g. urea-formaldehyde-alkanol condensates, only a minor proportion of the amine nitrogen resin which is thermosetting is required to provide the ordinarily desired degree of hardness. Typical useful proportions usually range from 5% to about 25% of the heat-reactive amine nitrogen resin based on the weight of the esterified epoxypolyether resin.

The pigment content of the primer is not significantly critical and can consist of prime pigments and extender pigments in the ordinary proportions used in primer formulations. For use under while appliance finishes, the primer is preferably pigmented with white prime pigments and white extender pigments, the prime pigment preferably being titanium dioxide or a mixture of titanium dioxide and zinc oxide. Barytes or a mixture of the barytes and aluminum silicate is preferred as the extender pigment. Particularly preferred grades of these extender pigments are of low micron particle size, i.e. ground to less than 15 micron particle size.

The organic coating composition used as the coating layer superimposed on the primer layer can be selected from a wide variety of coating compositions having a heat-curable organic film-forming vehicle based on a mixture of at least one heat-reactive resinous component which is thermosetting and at least one plasticizing resinous component as indicated above. Appliance finishes ordinarily are white or light tints and in order to provide optimum resistance to color change and adequate exposure resistance to its use environment, the topcoat coating composition ordinarily is formulated with non-volatile film-forming materials well recognized for their resistance to yellowing and for their chemical resistance in the cured state. Urea-formaldehyde-$C_1$-$C_4$ alkanol condensates and melamine-formaldehyde-$C_1$-$C_4$ alkanol condensates obtained by well known methods fundamentally involving reacting urea and formaldehyde or dimethylol urea or melamine and formaldehyde or a reaction product thereof, e.g. tetra-, penta- or hexamethylol melamine with a $C_1$-$C_4$ alkanol, i.e. methanol, ethanol, propanol, butanol or isobutanol, usually in an amount in excess of that required to etherify all of the methylol group, are particularly useful as the heat-reactive resinous component. These are usually described as urea- and melamine-formaldehyde coating resins and are commercially available under the trade names "Resimene," "Uformite," "Plaskon," "Bettle," "Melmac" and "Beckamine."

One group of particularly preferred plasticizing resinous components is represented by non-yellowing short oil length glyceryl phthalate alkyd resins, e.g. 35%-40% oil length alkyd resin in which the oil content thereof is either coconut oil, castor oil or a mixture of coconut and castor oils. A second especially preferred group of plasticizing resinous components are the soluble vinyl copolymers as represented by terpolymers of a monomer mixture of 55-85% by weight of styrene, 5-35% of an arcylic acid ester of a lower alkanol, i.e. $C_1$ to $C_4$, and 5-15% of methacrylic acid.

Preferred topcoat formulations have as the non-volatile film-forming vehicle thereof a compatible mixture of from 10% to 70% of the heat-reactive resinous component and correspondingly from 90% to 30% by weight of either of the aforementioned especiallly preferred resinous plasticizing components, a ratio of about 1.5 parts of the plasticizing resinous component per part of the heat-reactive urea- or melamine formaldehyde resin being particularly preferred.

The proportion of pigment in the topcoat composition is not significantly critical and usually ranges up to about 200% by weight based on the total organic film-forming material present. The pigment usually is titanium dioxide and it may be tinted with heat-resistant tinting pigments.

The total non-volatile content of either the liquid primer composition or the liquid topcoat composition can range up to 90% by weight of the total composition and ordinarily is at least 15%. The volatile content, correspondingly from 10% to 85% by weight of the composition, includes at least one volatile liquid organic solvent for the organic film-forming components. Volatile liquid non-solvent organic diluents can be present in combination with the active solvent and when the organic peroxygen compound is to be included in the primer composition, the volatile content further includes a volatile liquid organic solvent for the organic peroxygen if neither the solvent for organic film-forming material nor the mixture thereof with the non-solvent diluent therefor is an adequate solvent for the organic peroxygen compound. Suitable solvents, and diluents which can be used mixed with solvents, useful as the volatile organic liquid portion of the coating compositions include aromatic and aliphatic hydrocarbons, alcohols, ketones and esters. Mixtures of aromatic hydrocarbons, high solvency petroleum naphthas having a high aromatic content, and aliphatic monohydric alcohols, such as butanol and isopropanol, are usually preferred. The solvent or volatile liquid portion of the coating composition should be sufficiently volatile to readily evaporate from a wet coating during the baking or curing step and therefore it is desirable that the boiling end point of the volatile liquid components is no greater than the maximum baking temperature. When the primer is an aqueous dispersion coating composition having the film-forming coating components as the dispersed phase, the continuous aqueous phase usually includes a volatile water-soluble organic liquid which is a solvent for the film-forming material in an effective proportion to serve as a coalescing agent for the dispersed particles on loss of water.

In addition to the essential components, the coating compositions can include if desired other functional components ordinarily found in coating compositions such as dispersing agents, bodying agents, driers, accelerators, anti-skinning agents, flow control agents, slip agents to provide abrasion resistance, etc. When these agents are present with the organic peroxygen compound, they should be substantially non-reactive therewith in order that the peroxygen content is maintained at an effective level.

The coating compositions, primers and topcoat formulations, can be applied by any conventional method such as by spraying, brushing, dipping, flowing or roller coating, spraying ordinarily being preferred. The complete coating is heated to baking temperature by conventional means to harden and cure the coating, i.e. curing is by a single bake without subjecting the primer or intermediate coats to an initial bake. The volatile solvents of the applied wet primer formulation are allowed to evaporate to superficially dry the primer before the next coat is superimposed. This drying of the primer is usually for about 5-15 minutes at ordinary room temperature, but the evaporation of the volatile portion can be accelerated by passing a stream of warm air over the wet coated surface, the temperature of the air being up to about 160° F.

Baking of the complete coating ordinarily is at a temperature in the range of 250° F. to 500° F. for a heating period of several minutes at 500° F. to 120-150 minutes at 250° F. Preferred baking schedules range from 30 to 60 minutes at 275° F. to 10 to 20 minutes at 400° F. The optimum baking schedules usually range from 20 to 40 minutes at 300° F. to 15 to 25 minutes at 350° F.

The following examples are provided to illustrate the principles and practice of the invention, but its scope is not limited to the details of these illustrative examples. Unless otherwise indicated, the parts and percentages are on a weight basis.

EXAMPLE 1

One surface of sheet metal panel of "Paintlok" metal, phosphatized zinc coated sheet steel, was wet with a 2% solution of cumene hydroperoxide in xylol and the xylol was allowed to evaporate from the metal surface at room temperature of about 77° F. Then a coat of primer was sprayed on the surface of the cumene hydroperoxide treated metal to a thickness corresponding to about 1 mil. dry thickness and after the primer flash dried at room temperature for about 10 minutes, a topcoat formulation was sprayed over the primer coat at a thickness of about 1 mil. dry thickness to provide a composite coating having a total dry thickness of about 2 mils. Then the composite coating on the metal panel was heated for 30 minutes at 300° F. to dry, harden and cure the coating.

The liquid primer coating has the following composition.

Primer Formulation I

| | Parts by wt. |
|---|---|
| Esterified epoxy-polyether resin solution (45% non-volatile in Xylol) | 39.2 |
| Titanium dioxide | 8.3 |
| Zinc oxide | 9.7 |
| Barytes—low micron size—less than 15 microns | 20.4 |
| "Ortholeum" solution of mono- and dialkyl phosphates—50% concentration in high solvency petroleum naphtha | 0.4 |
| Water | 0.3 |
| Xylol | 11.5 |
| High solvency petroleum naphtha, boiling range 130° C.–195° C. A.P. 13° C | 7.0 |
| Butylated urea-formaldehyde resin solution—60% non-volatile in butanol | 3.2 |
| | 100.0 |

The esterified epoxy-polyether resin is the product of estereifying an epoxy-polyether condensate of epichlorohydrin and diphenylolpropane characterized by an epoxy equivalent of 870–1025 and an esterification equivalent of about 175 ("Epon" 1004) with dehydrated castor oil acids in an amount sufficient to react with about 40% of the esterifiable groups of the epoxy-polyether resin, i.e. there are about 0.4 equivalent of dehydrated castor oil acids per esterification equivalent of the epoxy-polyether resin. The esterification equivalent of the epoxy-polyether resin. The esterification equivalent of the epoxy-polyether resin is defined as the weight in grams of the resin required in fully esterifying 1 gram molecular weight of monocarboxylic acid. The epoxy equivalent weight of the epoxy-polyether resin is defined as the weight in grams of the resin which supplies one gram equivalent weight of the epoxy moiety

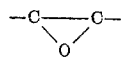

The coating composition is prepared by dispersing the pigments in the solution of the epoxy-polyether resin by a conventional dispersion technique and then adding and mixing with the resulting pigmented intermediate, the butylated-urea-formaldehyde resin solution and additional solvent and/or diluents.

For spray application, the above primer composition is thinned in the proportion of 100 parts of the coating composition and about 20 parts of a thinner composed of 77% isopropanol and 23% xylol.

For alternative application of the primer composition by flow-coating, 100 parts of the primer composition is thinned with 80 parts of thinner composed of about 99% of high solvency petroleum naphtha, boiling range 175° C.–233° C. A.P. 4° C. (Solvesso #150) and 1% of turpentine.

The liquid topcoat formulation is as follows:

Topcoat A

| | Parts by wt. |
|---|---|
| First portion: | |
| Coconut oil modified alkyd resin solution, 60% non-volatile in xylol | 9.5 |
| Toluol | 3.8 |
| Butanol | 0.8 |
| Titanium dioxide | 28.5 |
| Second portion: | |
| Coconut oil modified alkyd resin solution, 60% in xylol | 26.0 |
| Third portion: | |
| Butylated melamine-formaldehyde resin, 50% in butanol-xylol | 14.3 |
| Butylated urea-formaldehyde resin, 60% in butanol | 11.9 |
| Fourth portion: | |
| Wax dispersion, 30% non-volatile in butanol | 0.2 |
| Butanol | 0.8 |
| Xylol | 4.2 |
| | 100.0 |

The coconut oil modified alkyd resin is a 37% oil length glyceryl-phthalate alkyd resin having an acid number of about 5 and a content of unreacted hydroxyl substituent equivalent to about 5.7% of glycerol. The viscosity of the resin solution at 60% concentration is about 2–3 Gardner-Holdt.

The melamine resin is 50% non-volatile in a mixture of 4 parts butanol and 1 part xylol.

The wax dispersion consists of 15% candelilla wax and 15% butylated urea-formaldehyde resin in butanol.

In preparing the coating composition, the pigment is dispersed in the alkyd resin solution as the first portion by conventional pigmented dispersion technique. Then the second portion is mixed with the first portion and thereafter the third and fourth portions are successively added and mixed with the preceding combined portions.

The non-volatile content of the composition of Topcoat A essentially consists of about 60 parts of coconut oil modified alkyd resin—20 parts of butylated melamine-formaldehyde resin and 20 parts of butylated urea-formaldehyde resin for a total of 100 parts by weight of organic film-forming material, and about 80 parts by weight of titanium dioxide per 100 parts by weight of the organic film-forming material.

For comparison, a second metal panel of the same quality, except that prewetting of metal surface with the solution of cumene hydroperoxide had been omitted, was coated with the primer and topcoat in the identical manner as indicated above in Example 1 and the composite coating was cured by heating for 30 minutes at 300° F.

A second comparison panel was prepared by preheating the "Paintlok" metal panel, untreated with cumene hydroperoxide, for 30 minutes at 300° F. On cooling to room temperature, the metal panel was coated as described in the preparation of the first comparison panel and the composite coating was cured by heating for 30 minutes at 300° F.

The coated panel of Example 1 was free of bubbles and blisters characteristic of hydrogen popping. The first comparative panel which had no treatment with organic peroxygen compound exhibited characteristic hydrogen popping. The second comparative panel which was subjected to two heating cycles, a metal preheating cycle to remove the detrimental concentration of hydrogen and the regular baking cycle for the applied coating, was free of hydrogen popping and was comparable in appearance with the coated metal panel of Example 1.

EXAMPLE 2

The general procedure of Example 1 was repeated in that a series of "Paintlok" metal panels were separately wet with solutions of ditertiarybutyl peroxide in xylol ranging in concentration from 0.5% to 5% by weight as the organic peroxygen compound in place of cumene hydroperoxide. None of the completed coated panels exhibited hydrogen popping.

EXAMPLE 3

The step in Example 1 of initially prewetting the metal panel with the 2% solution of cumene hydroperoxide was omitted and instead cumene hydroperoxide in the dissolved state was included in the primer composition in an amount of 2% based on the total weight of the liquid primer composition to provide for concurrent steps of exposing the metal surface to contact with the organic peroxygen compound and contiguously applying the primer composition. Baking was as in Example 1.

The completed coated panel of this example was identical in appearance with the coated panel prepared in Example 1 and was free of hydrogen popping.

This procedure of Example 3 was repeated respectively substituting "Weirzin" sheet metal, "Paintgrip" sheet metal, and "Zincgrip-Paintgrip" sheet metal for the "Paintlok" sheet metal. All of these sheet metal substrates are representative of sheet steel having a thin protective coating of zinc on the surface thereof and are susceptible to causing hydrogen popping in baking-type organic coatings applied thereover. None of the resulting organic coated sheet metal panels exhibited hydrogen popping.

EXAMPLE 4

Example 3 was repeated using 5% of tertiarybutyl hydroperoxide in place of 2% of cumene hydroperoxide. The resulting organic coated metal panel was free of hydrogen popping. When the content of tertiarybutyl hydroperoxide was at 1% based on the weight of the liquid primer, inhibition of hydrogen popping was incomplete although the improvement was significant over the comparison panel which exhibited the ordinary amount of hydrogen popping.

EXAMPLE 5

Example 3 was repeated using from 0.125% to 2% of dibenzoyl peroxide in place of the 2% of cumene hydroperoxide in the liquid primer composition. The dibenzoyl peroxide was fully effective as an inhibitor for hydrogen popping at a concentration as low as 0.25%. Even at 0.125% concentration of this inhibitor, an improvement in resistance to hydrogen popping was observed. While the dibenzoyl peroxide is highly effective as the inhibitor for hydrogen popping, it has significant disadvantages. Coating compositions having this inhibitor included therein are less package and storage stable in comparison with the liquid coating compositions containing effective proportions of cumene hydroperoxide, ditertiarybutyl peroxide and other less active organic peroxygen compounds. Liquid coating compositions containing useful concentrations of dibenzoyl peroxide rapidly gel to a non-useful condition. Heat-cured coatings from compositions containing this peroxide are susceptible to yellowing.

EXAMPLE 6

Into the liquid primer composition described in Example 1 were added cumene hydroperoxide in the amount of 1% and di-benzoyl peroxide in the amount of 0.125% based on the total weight of the liquid primer composition, each respective concentration of the organic peroxygen compounds alone being insufficient to completely inhibit hydrogen popping. The primer was applied to the hydrogen popping susceptible sheet metal panel as described in Example 3 to provide a primer layer of about 1 mil dry thickness contiguous with the metal surface. After air-drying the heat-curable primer layer for 10 minutes at room temperature, a topcoat layer of about 1.5 mils dry thickness was sprayed over the primer layer and then the composite coating was heated for 30 minutes at a baking temperature of 325° F. This liquid primer was stable and did not gel during storage.

The superimposed liquid topcoat formulation has the following composition:

*Topcoat B*

| | Parts by wt. |
|---|---|
| First portion: | |
| Styrene/ethyl acrylate/methacrylic acid terpolymer solution, 55% non-volatile | 9.3 |
| Titanium dioxide | 27.3 |
| Butanol | 10.0 |
| Xylol | 1.3 |
| Second portion: | |
| Terpolymer solution, 55% non-volatile | 34.2 |
| Epoxy-polyether resin solution, 50% in equal parts of isopropanol and xylol | 12.2 |
| Third portion: | |
| Wax dispersion, 30% non-volatile | 1.8 |
| Isopropanol | 1.6 |
| Fourth portion: | |
| Octadecyl trimethyl ammonium acid phthalate solution, 20% concentration in xylol-methanol mixture | .25 |
| Isopropanol | 2.05 |
| | 100.00 |

For spray application, the composition is thinned with 10 additional parts of an equal mixture of toluol and xylol.

The styrene-ethyl acrylate-methacrylic acid terpolymer is the solution polymerization product of a ternary monomer mixture of 70% styrene, 20% ethylacrylate and 10% methacrylic acid. The terpolymer is prepared by continuously adding over a 3 hour period a uniform mixture of 6871 parts of the monomers and additionally containing 68.7 parts of di-tertiarybutyl peroxide to 2945 parts by weight of high solvency petroleum naphtha held at a temperature of 300° F. to 310° F. Thereafter the polymerization charge is held for about 90 minutes at 300° F. to 320° F., then cooled to room temperature and thinned to 55% non-volatile content with a mixture of 60% xylol and 40% butanol by weight. Thus the terpolymer product solution has the following approximate composition:

| | Percent |
|---|---|
| Terpolymer | 55 |
| High solvency petroleum naphtha | 23 |
| Xylol | 13 |
| Butanol | 9 |
| | 100 |

The high solvency naphtha is characterized by a boiling range of 150° C. to 190° C. and an aniline point of −28° C. ("Solvesso" 100). The viscosity of this solution is about Z–1 Gardner-Holdt at 25° C. The terpolymer is characterized by a relative viscosity of 1.09 based on a solution 0.50 gram of the terpolymer in 50 ml. of ethylene dichloride, measuring the efflux time at 25° C. in accordance with ASTM-D-445-53T using a Cannon-Fenske viscosimeter of series or size number 100.

The epoxy-polyether resin is the condensation product of epichlorohydrin and diphenylolpropane (bis-phenol) characterized by an epoxy equivalent weight of 450 to 525 grams and an esterification equivalent of about 130 grams. "Epon" 1001 and "Epi-Rez" 520 are commercially available epoxy-polyether resins having the above specification.

The wax dispersion is a dispersion of 15% "Polymekon" polymerized microcrystalline wax, softening point 195° F.–200° F. in a 15% solution of the described terpolymer in butanol-aromatic hydrocarbon mixture.

EXAMPLE 7

Cumene hydroperoxide in an amount of 2% by weight was included in the Topcoat B composition described in Example 6 and two wet on wet coats of this composition at spraying consistency were applied self-primed on a "Paintlok" metal panel for a total dry film thickness of about 2 mils and thereafter cured by heating for 30 minutes at 325° F. The completed organic finished metal panel was free of hydrogen popping defect.

EXAMPLE 8

The general procedure of Example 3 was followed incorporating 2% of cumene hydroperoxide in a liquid primer formulation II having a pigment to binder ratio of 170 parts by weight of pigment to 100 parts by weight of the organic film-forming binder, the binder consisting by weight of 80 parts of tall oil fatty acid ester of epoxy-polyether resin ("Epon" 1004) and 20 parts of butylated urea-formaldehyde resin. The esterified epoxy-polyether resin is the esterification product of about 75.5 parts of epoxy-polyether resin ("Epon" 1004), 22.5 parts of tall oil fatty acids-fractionated, and 2 parts of phthalic anhydride. The pigment consists of a mixture of about 56% barytes, 12% aluminum silicate and 32% titanium dioxide. The volatile composition consists essentially of a major proportion of volatile hydrocarbons, mainly aromatic of the xylol type, and a minor proportion of butanol and isopropanol. The primer was sprayed on the "Paintlok" metal panel at a dry thickness of about 1 mil.

The primed panel which was air-dried for 10 minutes at room temperature was topcoated with 1.5 mils of a topcoat C. composition having a pigment to binder ratio of 90 parts by weight of titanium dioxide to 100 parts by weight of organic film-forming binder consisting essentially of 50% by weight of styrene (70-ethyl acrylate (20-methacrylic acid (10) terpolymer, 40% butylated urea-formaldehyde resin and 10% methylol melamine methyl ether. The terpolymer is the same as that described in Example 6. The volatile liquid portion consists of a major proportion of volatile hydrocarbons, mainly aromatic of the xylol type, and a minor proportion of an alcohol mixture including butanol and diacetone alcohol. The composite coating, i.e. primer II plus topcoat C, on the panel was cured by heating for 20 minutes at a baking temperature of 350° C.

The completed organic coated metal panel was free of hydrogen popping.

EXAMPLE 9

The general procedure of Example 3 was followed by incorporating 2% of cumene hydroperoxide in a liquid primer formulation III having a pigment to binder ratio of about 200 parts by weight of pigment per 100 parts by weight of organic film-forming binder, the binder consisting of about 90% by weight of 56% oil length dehydrated castor oil modified glyceryl phthalate alkyd resin and 10% butylated ureaformaldehyde resin. The pigment consists of a mixture of 80% of low micron size barytes and 20% titanium dioxide. The volatile portion is composed essentially of volatile hydrocarbons including high solvency petroleum naphthas and mineral spirits. The primer was applied to the "Paintlok" metal surface to a dry film thickness of about 1 mil by spraying and after accelerated drying for 10 minutes at a temperature of about 150° F., the primed surface of the metal was sprayed with 1.5 mils dry film-thickness of topcoat D composition. The composite coating was cured by heating for 20 minutes at 350° F.

The topcoat D formulation has a pigment to binder ratio of 80 parts by weight of titanium dioxide per 100 parts by weight of organic film-forming binder. The binder consists of essentially of 60% by weight of fatty acid modified alkyd resins, 30% butylated urea-formaldehyde resin and 10% methylol melamine methyl ether. The alkyd resin portion consists of a mixture of short oil length dehydrated castor modified glyceryl phthalate alkyd and short oil length mixed castor oil-coconut oil modified glyceryl phthalate alkyd, the average oil length being about 40% and the alkyd modifying fatty oil components being in the proportion of about 25 parts coconut oil, 35 parts castor oil and 40 parts dehydrated castor oil.

The completed organic coated sheet metal was free of hydrogen popping.

The above described metal coating system is particularly adaptable to finishing refrigerators and freezers. Appliance body parts fabricated from metal susceptible to hydrogen popping and coated with the primer and topcoat as described above in Example 9 were free of the hydrogen popping defect.

Washing machine parts, i.e. wringer drip pans fabricated from "Paintlok" metal, finished with the composite coating as described in Example 3 were free of the hydrogen popping effect. Service performance of the organic coated metal part was equal to that of the metal part preheated adequately to inhibit hydrogen popping and then finished with the corresponding primer from which the organic peroxygen compound was omitted and the same topcoat was superimposed on the primer layer. The results of the performance comparison indicated that service performance is not adversely affected by the presence of an effective concentration of the organic peroxygen compound in the primer sufficient to inhibit hydrogen popping.

I claim:

1. The method of inhibiting hydrogen popping in an organic coating composition applied to a metal surface normally susceptible to releasing hydrogen in an amount ordinarily sufficient to cause said hydrogen popping comprising the steps of (a) contacting the surface of said metal with an effective concentration of at least one soluble organic peroxygen compound, in solution at a concentration up to 10% in a non-reactive volatile liquid solvent therefor, sufficient to inhibit said hydrogen popping, (b) applying to said metal surface in the presence of said peroxygen compound at least one coat of a liquid organic coating composition comprising a non-volatile heat-curable organic film-forming material and a volatile liquid portion comprising an organic solvent for said film-forming organic material, and (c) heating the resulting coated metal surface at an elevated temperature in the range of from about 250° F. up to a temperature below the decomposition temperature of said organic film-forming material for a period sufficient to cure said coating, said organic peroxygen compound being characterized by a peroxygen equivalent weight up to about 225 and having the peroxygen moiety —O—O— thereof satisfied with from 1 to 2 organic radicals each containing at least 4 carbon atoms, one hydrogen being joined to said peroxygen moiety when the number of said organic radicals is less than 2.

2. The method of claim 1 wherein said solution of organic peroxygen compound in said step (a) contains from 0.1% to about 10% by weight of said soluble organic peroxygen compound and said non-reactive volatile liquid solvent therefor is an organic solvent characterized by a boiling range within the limits of about 175° F. to 500° F., said steps (a) and (b) being consecutive.

3. The method of claim 1 wherein said heating in step (c) is at a temperature from 250° F. to about 500° F. for an effective heat-curing period ranging from about several minutes at the indicated high temperature to about 150 minutes at the indicated low temperature sufficient to cure said heat-curable organic film-forming material.

4. The method of claim 1 wherein said step (b) includes initially applying to said metal surface a coat of liquid heat-curable primer coating composition and superimposing on said primer coat in its uncured state at least one coat of a liquid heat-curable organic topcoat composition, said liquid topcoat composition and said liquid primer composition each essentially comprising a non-volatile, heat-curable organic film-forming material in solution in a volatile liquid organic solvent therefor and having pigment dispersed in said solution of film-forming material, said liquid primer composition containing additionally an effective concentration of said soluble organic peroxygen compound in solution in a volatile liquid organic solvent therefor in the range of 0.2% to 5% of the peroxygen compound based on the weight of said liquid primer composition, said step (a) thereby being concurrent with the application of said liquid primer composition.

5. The method of claim 1 wherein said step (a) and said step (b) are concurrent, said coating of liquid organic coating composition contiguous with said metal surface including said soluble organic peroxygen compound and a volatile liquid organic solvent therefor, said peroxygen compound being present therein at an effective proportion ranging from 0.2% to 5% based on the weight of the liquid organic coating composition.

6. The method of claim 5 wherein said organic peroxygen compound is a hydrocarbon hydroperoxide having the general formula R—O—O—H where R— is a saturated hydrocarbon radical including a tertiary carbon atom joined directly to the peroxygen moiety of said peroxygen compound.

7. The method of inhibiting hydrogen popping in an organic coating composition applied to a metal surface normally susceptible to releasing hydrogen at an elevated temperature in an amount ordinarily sufficient to cause said hydrogen popping comprising the steps of (a) contacting the surface of said metal with an effective concentration of a soluble organic peroxygen compound having the general formula $R_1$—O—O—$R_2$ where $R_1$ and $R_2$ are hydrocarbon radicals each having at least 4 carbon atoms including a tertiary carbon atom joined directly to the —O—O— peroxygen moiety of said peroxygen compound, the sum of the carbon atoms in $R_1$— and $R_2$— being no greater than 22, said peroxygen compound being in solution in a volatile liquid organic solvent therefor, (b) applying to said metal surface, concurrently with said soluble, organic peroxygen compound, at least one coat of a liquid organic coating composition comprising a nonvolatile heat-curable organic film-forming material and a volatile liquid organic solvent for said film-forming material and (c) heating the resulting coated metal surface at a temperature of at least 250° F. and below the decomposition temperature of said organic film-forming material for a period sufficient to cure said organic coating, the effective concentration of said peroxygen compound being from 0.2% to 5% based on the total weight of said liquid coating composition and said solution of the peroxygen compound.

References Cited in the file of this patent

UNITED STATES PATENTS

| | | |
|---|---|---|
| 2,407,881 | Hoover | Sept. 17, 1946 |
| 2,494,297 | Hempel | Jan. 10, 1950 |
| 2,524,536 | Nordlander et al. | Oct. 3, 1950 |
| 2,548,504 | Te Grotenhuis et al. | Apr. 10, 1951 |
| 2,819,192 | Young | Jan. 7, 1958 |
| 2,887,404 | Evans | May 19, 1959 |

UNITED STATES PATENT OFFICE
CERTIFICATE OF CORRECTION

November 20, 1962

Patent No. 3,065,102

Seymore Hochberg

It is hereby certified that error appears in the above numbered patent requiring correction and that the said Letters Patent should read as corrected below.

Column 6, line 71, for "epichlorophydrin" read -- epichlorohydrin --; line 74, for "of", second occurrence, read -- to --; column 7, line 16, for "while" read -- white --; column 9, lines 48 and 49, strike out "The esterification equivalent of the epoxy-polyether resin."; column 10, line 28, for "2-3" read -- Z-3 --; column 12, line 58, for "effux" read -- efflux --; column 13, line 42, for "350° C." read -- 350° F.--; line 69, strike out "of", first occurrence.

Signed and sealed this 14th day of May 1963.

(SEAL)
Attest:

ERNEST W. SWIDER
Attesting Officer

DAVID L. LADD
Commissioner of Patents